Aug. 5, 1947.  M. S. JOHNSON  2,425,189
COMBINATION PIPE ANCHOR AND BRANCH PIPE TEE
Filed June 8, 1944
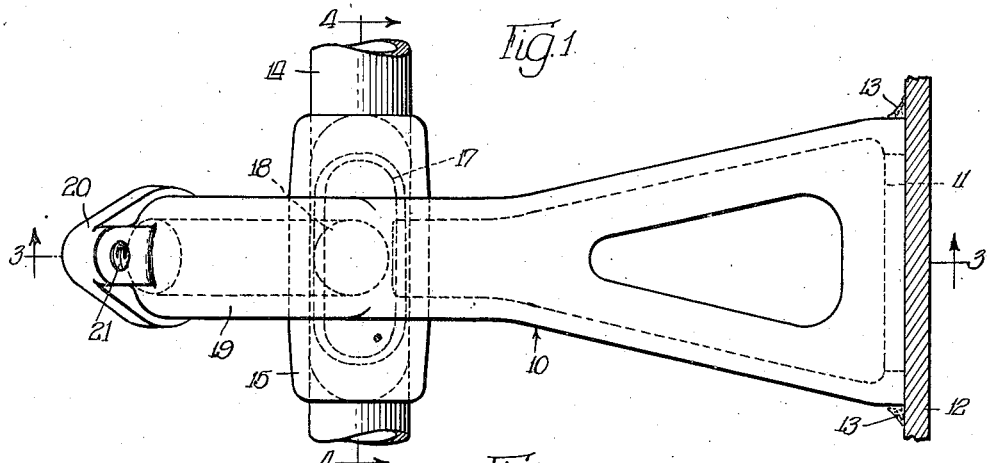
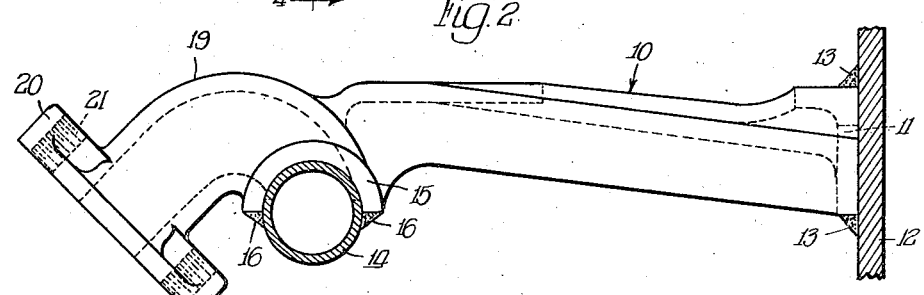
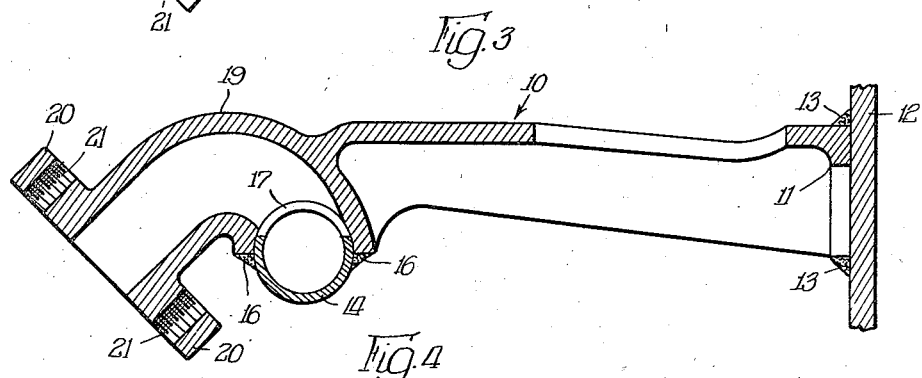
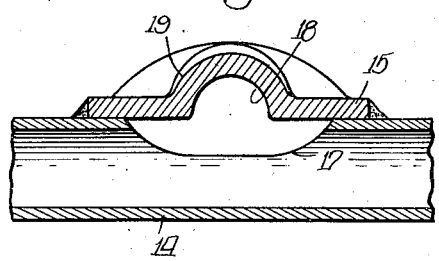
INVENTOR.
Malcolm S. Johnson,
BY
*atty.*

Patented Aug. 5, 1947

2,425,189

UNITED STATES PATENT OFFICE 2,425,189

COMBINATION PIPE ANCHOR AND BRANCH PIPE T

Malcolm S. Johnson, Chicago, Ill., assignor to Illinois Railway Equipment Company, Chicago, Ill., a corporation of Illinois Application June 8, 1944, Serial No. 539,341

2 Claims. (Cl. 285—209)

My invention relates to a single piece anchor and branch pipe or T connection especially adapted for anchoring the train lines or main air pipes to a railroad car underframe and at the same time providing a branch pipe connection for attachment of a branch pipe leading to the pressure tanks or other elements of the air brake mechanism located beneath each car.

The invention has for its object the provision of a one piece member which may be readily secured at one end to the car underframe or center sill and formed at its other end to receive the uninterrupted main air line of the car and permit the latter to be intimately connected thereto; said end of the member being also formed to constitute a T or branch pipe connection to which the branch pipe may be easily attached; the invention providing a non-shifting connection between the main air line and the bracket and also eliminating the labor and expense of effecting and maintaining air tight connections between the branch pipe T and adjacent sections of the main air line as, however, is the case with structures as at present employed and which require the use of pipe anchors for the separated sections of the main air line.

The objects and advantages of my invention will be readily comprehended from the following detailed description of the accompanying drawing wherein:

Figure 1 is a top plan view of my improved anchor and branch pipe T, with a portion of the main air line secured thereto and a portion of a car center sill shown in section.

Figure 2 is a side elevation of the structure shown in Figure 1.

Figure 3 is a longitudinal section taken on the line 3—3 of Figure 1.

Figure 4 is a cross section taken on the line 4—4 of Figure 1 looking in the direction of the arrows.

My invention relates to means whereby the train line or main air pipe of the air brake system—which extends longitudinally beneath a railroad car from end to end—may be rigidly supported from the car underframe or center sill and at the same time provide an air connection for the branch pipe leading to the pressure tanks or other elements of the brake system beneath the car.

In present day practice, in order to effect connections between the main air line and the respective pressure tanks and elements of the air brake system of each car, a section of the main air line is removed to receive a suitable T connection for connecting the branch pipe, thus necessitating the use of a plurality of pressure resisting couplings on opposite sides of the connection, in addition to the coupling for securing the branch pipe to the connection. It is also necessary to employ a suitable anchor or bracket—involving suitable pipe clamping elements on opposite sides of the T connection—whereby the main air line is rigidly secured to the car center sill against vibration.

As is apparent such installation involves considerable time and expense, as well as a number of couplings between the main line sections and the T connection where air leaks are possible.

My invention, designed to eliminate the multiple connections and difficulties mentioned, comprises a T connection and bracket unit adapted to become a rigid part of the car underframe and the main air line or pipe and, in the particular exemplification shown in the drawing, consists of a bracket arm 10, preferably of semi-circular cross-section, and flaring or gradually increasing in width toward its base where it is shown provided with a reenforcing rib or flange 11 provided with a plane outer face to extend flush with the side or web of the car center sill, of which a portion is shown at 12, to which the bracket preferably is welded as indicated at 13; the weld extending throughout the perimeter of the bracket. The bracket arm 10 is of predetermined length in keeping with the conventional spaced relation between the center sill and the main air line, of which a portion is shown at 14, and which extends lengthwisely beneath the car.

Adjacent the outer end, the bracket is formed to provide a transversely disposed substantially semi-cylindrical air line receiving saddle or overlapping portion 15, which is adapted to be welded to the air line as indicated at 16, after the air line 14 has been provided with a suitable opening on its upper side as indicated in dotted lines at 17, in Figure 1 and in full lines in Figure 4; the opening 17, in order to take care of slight variations in bracket location, is preferably made oblong as shown.

The saddle portion 15, intermediate its ends, is provided with an opening 18, which communicates with the angularly disposed and downwardly curved integral neck 19, which terminates in the coupling flanges 20, 20, which preferably, in order to afford proper access, extend upwardly and downwardly from the neck 19, as shown. These flanges are shown provided with tapped holes 21, 21, to permit a similarly flanged coupling of a branch air line to be secured thereto.

The bracket arm portion of the cast unit preferably is formed as shown and described for purposes of strength; and after the train line 14 has been provided on its upper side with the opening 17, it is seated in the saddle portion 15 of the unit with the train line opening 17 in register with the intermediate opening 18 in the saddle; the unit, after having been welded to the web of the center sill, is then welded to the train line, thereby providing a rigid, non-shifting anchor between the car center sill and the train line or main line of the car, as well as a joint-free T connection for the branch pipe which merely requires a single air-tight connection to be maintained with the branch pipe and hence greatly reduces maintenance expense.

The exemplification is believed to be the simplest embodiment of the invention, but certain structural modifications may be possible without, however, departing from the spirit of the invention as defined in the appended claims.

What I claim is:

1. In combination with the continuous air line or pipe of a railroad car, said pipe on one side being provided with an opening; a combination pipe anchor and branch pipe connection comprising a single piece casting formed to provide an elongated bracket arm adapted at one end to be intimately secured to a car center sill while the other end is provided with a transversely disposed semi-cylindrical open sided saddle portion provided with a cavity having an opening intermediate its ends, said saddle portion being adapted to overlap the opening in said air pipe and to be welded to said pipe, and a conduit portion communicating with the opening in the saddle portion and extending laterally therefrom substantially in line with said bracket arm and provided with attaching surfaces.

2. A single piece combination pipe anchor and branch pipe T comprising a conduit portion formed adjacent its orifice at one end with laterally disposed attaching surfaces while the other end adjacent its orifice is formed with concaved saddle forming segmental flanges extending laterally from opposite sides of the conduit portion and adapted to overlap and be secured over a side opening in a railroad car air line extending parallel with said flanges, and an elongated bracket arm integral with one side of said conduit portion and said saddle-flanges with the outer end of said arm formed for attachment to a railroad car under-sill.

MALCOLM S. JOHNSON.

REFERENCES CITED

The following references are of record in the file of this patent:

UNITED STATES PATENTS

| Number | Name | Date |
|---|---|---|
| 110,334 | Bate | Dec. 20, 1870 |
| 185,075 | Clapp et al. | Dec. 5, 1870 |
| 215,987 | Spofford | May 27, 1879 |